United States Patent
Atkins et al.

(10) Patent No.: US 11,912,941 B2
(45) Date of Patent: Feb. 27, 2024

(54) SYSTEMS AND METHODS FOR THE MANUFACTURE OF HIGH MELTING HYDROCARBONS FROM COAL

(71) Applicant: CARBON HOLDINGS INTELLECTUAL PROPERTIES, LLC, Sheridan, WY (US)

(72) Inventors: Charles Agee Atkins, Sheridan, WY (US); Christopher L. Yurchick, McDonald, PA (US); Charles S. Hill, Sheridan, WY (US)

(73) Assignee: CARBON HOLDINGS INTELLECTUAL PROPERTIES, LLC, Ranchester, WY (US)

( * ) Notice: Subject to any disclaimer, the term of this patent is extended or adjusted under 35 U.S.C. 154(b) by 0 days.

(21) Appl. No.: 17/184,495

(22) Filed: Feb. 24, 2021

(65) Prior Publication Data

US 2021/0261868 A1 Aug. 26, 2021

Related U.S. Application Data

(60) Provisional application No. 62/980,940, filed on Feb. 24, 2020.

(51) Int. Cl.
| | | |
|---|---|---|
| *C10C 3/00* | (2006.01) | |
| *B01J 19/00* | (2006.01) | |
| *B01J 19/18* | (2006.01) | |
| *B01J 19/20* | (2006.01) | |
| *C10C 3/02* | (2006.01) | |
| *C10C 3/08* | (2006.01) | |

(52) U.S. Cl.
CPC ........... *C10C 3/002* (2013.01); *B01J 19/0026* (2013.01); *B01J 19/0066* (2013.01); *B01J 19/1806* (2013.01); *B01J 19/20* (2013.01); *C10C 3/023* (2013.01); *C10C 3/026* (2013.01); *C10C 3/08* (2013.01); *B01J 2219/00006* (2013.01); *B01J 2219/00247* (2013.01)

(58) Field of Classification Search
CPC .... B01J 19/20; B01J 19/0026; B01J 19/1806; B01J 2219/00247; C10C 3/026; C10C 3/06; C10C 3/08; C10B 7/10; C10B 47/44
See application file for complete search history.

(56) References Cited

U.S. PATENT DOCUMENTS

| | | | | |
|---|---|---|---|---|
| 2,432,734 | A * | 12/1947 | Doesken | B29B 9/065 425/107 |
| 5,262,043 | A | 11/1993 | Boenigk et al. | |
| 5,843,298 | A | 12/1998 | Orac et al. | |
| 9,939,197 | B2 * | 4/2018 | Hoffman | F26B 3/02 |
| 2010/0224534 | A1 * | 9/2010 | Couch | C10G 11/18 208/113 |

(Continued)

OTHER PUBLICATIONS

International Search Report and Written Opinion dated May 6, 2021 for International Application No. PCT/US2021/019495.

*Primary Examiner* — Lessanework Seifu
(74) *Attorney, Agent, or Firm* — Dorsey & Whitney LLP

(57) ABSTRACT

A method and apparatus are provided for processing hydrocarbon coal slurry feeds. The method and apparatus enhance the conversion of the coal feeds into useful conversion products, such as high melting and high carbon containing pitch products. In particular, the present techniques utilize a specially designed "self-cleaning" and "wall-catalyzed" preheater-reactor systems.

7 Claims, 2 Drawing Sheets

(56) References Cited

U.S. PATENT DOCUMENTS

| | | | |
|---|---|---|---|
| 2012/0111714 A1* | 5/2012 | Court | C07C 51/09 201/2.5 |
| 2012/0266529 A1* | 10/2012 | Scahill | C10C 5/00 202/84 |
| 2015/0352770 A1* | 12/2015 | Busenbecker | B22F 10/20 419/53 |
| 2017/0198221 A1* | 7/2017 | Targett | C10B 53/02 |
| 2018/0282903 A1 | 10/2018 | Muto et al. | |
| 2019/0194544 A1 | 6/2019 | Atkins et al. | |
| 2020/0299589 A1 | 9/2020 | Atkins et al. | |

* cited by examiner

H/C ratios of various hydrocarbon sources.

SYSTEMS AND METHODS FOR THE MANUFACTURE OF HIGH MELTING HYDROCARBONS FROM COAL

CROSS-REFERENCE TO RELATED APPLICATION

This application is a nonprovisional patent application of, and claims priority to, U.S. Provisional Patent Application No. 62/980,940 filed Feb. 24, 2020, and entitled "Systems and Methods for the Manufacture of High Melting Hydrocarbons from Coal," the disclosure of which is hereby incorporated by reference in its entirety.

FIELD

The described embodiments relate generally to carbon based processing methods. More particularly, the present embodiments relate to systems and methods for processing hydrocarbon coal slurry feeds into high melting and high carbon containing pitch products.

BACKGROUND

As is well known, for example in U.S. Pat. No. 4,590,055, the carbon fibers currently produced and widely used are classified into two groups, according to the starting material, i.e. the so-called PAN (polyacrylonitrile)-based carbon fibers prepared by the carbonization of polyacrylonitrile fibers, and the pitch-based carbon fibers prepared from pitches of coal- or petroleum-origin.

Despite the cost advantages of the pitch-based carbon fibers, the PAN-based carbon fibers occupy a majority of the current market of the industrial high-performance carbon fibers. These high performance PAN-based carbon fibers have high mechanical strength and high modulus suitable for reinforcing various composite materials. The tensile strength of the pitch-based carbon fibers currently being industrially produced is relatively low and limited to 200 kg/mm$^2$ or below.

Accordingly, various attempts have been made to develop high-performance carbon fibers starting from inexpensive pitch compositions. Needless to say, the properties of the starting pitch is one of the most important factors for obtaining high-performance pitch-based carbon fibers. Several proposals have been made for the preparation of a pitch composition suitable therefor, including (a) a method in which a specific condensed polycyclic aromatic compound is subjected to a heat treatment or treatment in hydrogen (see, for example, Japanese Patent Publication Nos. 45-28013 and 49-8634); (b) a method in which a mesophase pitch is obtained by subjecting a tar or pitch of petroleum origin to a first heat treatment in the presence of a Lewis acid catalyst followed by a second heat treatment after removal of the catalyst (see, for example, Japanese Patent Publication No. 53-7533); (c) a method in which a mesophase pitch having a desired mesophase content is obtained by the heat treatment of a pitch in an atmosphere of a flowing inert gas or under a reduced pressure (see, for example, Japanese Patent Kokai Nos. 53-86717 and 53-86718); and (d) a method in which an optically isotropic pitch is subjected to a treatment with an organic solvent, e.g. benzene, toluene and heptane, and the insoluble fraction is heated to form neomesophase (see, for example, Japanese Pat. Nos. Kokai 54-160427, 55-58287 and 55-130809).

Unfortunately, the above described methods are not effective enough to give a pitch composition from which high-performance carbon fibers can be made. In particular, historical methods have been insufficient to provide a pitch composition suitable to prepare carbon fiber with a tensile strength comparable to the PAN-based carbon fibers. Therefore, the actual application of carbon fibers prepared from an isotropic pitch is limited to those fields in which no particularly high strength is required for the carbon fibers, such as reinforcement in asbestos substitutes. Furthermore, the mesophase pitch produced in some of the above described methods has a problem in the practical manufacturing process due to the extremely high viscosity and poor spinability thereof, giving rise to a difficulty in the process of melt spinning at an economically feasible velocity.

Accordingly, it may be desirable to provide a more economical method for producing high melting and high carbon containing pitch products for the production of carbon fibers, foams, and other carbon based products.

SUMMARY

According to some aspects of the present disclosure, a new and improved system for making high carbon-containing coal tar pitch directly from raw coal is provided. According to one embodiment, the coal tar pitch is formed by generating high-velocity, highly-loaded slurry flows resulting in fluid driven ablation, and/or by specially designed reactor internals resulting in mechanical surface 'polishing.'

Another exemplary embodiment includes a mechanical system and a method of achieving similar non-fouling objectives. The exemplary embodiment employs a twin screw device with co-rotating screws of sufficiently high surface area to volume ratio, made of metals containing known catalysts such as iron (Fe), molybdenum (Mo), and nickel (Ni), which also retain some catalytic activity when sulfided, especially Fe and Mo. Tolerances between flight edges and barrel internals adjusted to certain ranges (<1~2 mm). Flight rotations can be reversed periodically for cleaning.

A third exemplary embodiment includes a serially connected system including a slurry mix tank feeding a mechanically driven twin screw device serving as a viscomechanical preheater, to surmount challenges with coal swelling during preheat and wall fouling.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components, as appropriate. For instance, methods described herein can be performed in an order different from that described, and various steps can be added, omitted, or combined. Also, features described with respect to some embodiments can be combined in other embodiments.

The present exemplary system and method can make high carbon-containing coal tar pitch directly from raw coal. The present system overcomes critical challenges associated with high temperature processing and liquefaction of coal slurries, namely fouling due to coke formation on preheater and reactor internals and on catalytic surfaces therein. Similarly, rheological and fouling challenges have traditionally been exacerbated by the swelling of coal particles during preheat and liquefaction. Further, some coal deposits naturally have a higher oxygen content, which may cause the pitch to be more reactive. The present exemplary system and method incorporates self-cleaning designs that mitigate these fouling challenges and improve product yield to desired high carbon containing pitch products, by generating high-velocity, highly-loaded slurry flows resulting in fluid driven ablation, and or by specially designed reactor internals resulting in mechanical surface 'polishing.'

These and other embodiments are discussed below with reference to FIGS. 1-4. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
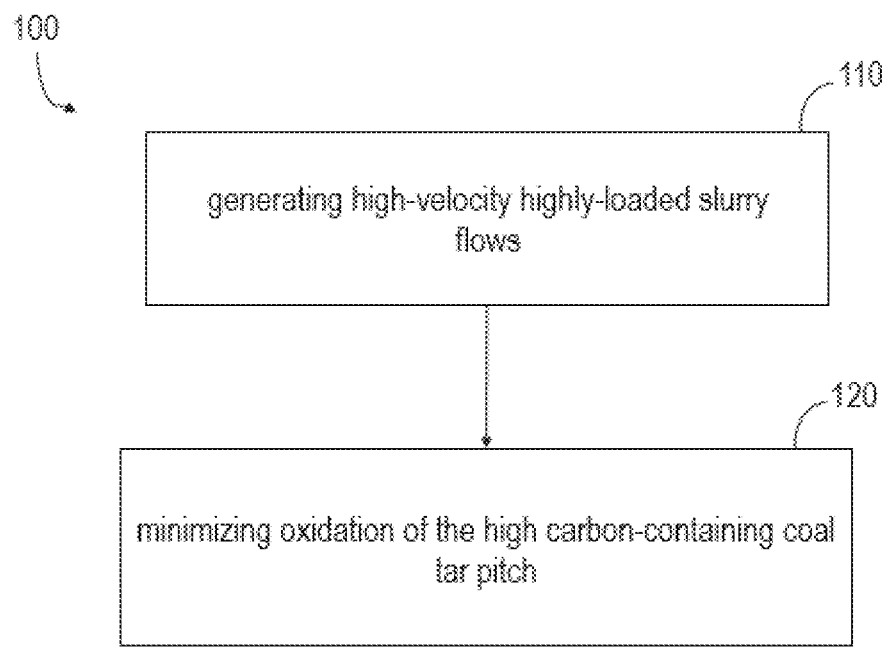
FIG. 1 is a flow diagram of a method of forming high carbon-containing coal tar pitch from raw coal, according to an embodiment of the present disclosure.

FIG. 1 illustrates a method 100 of forming high carbon-containing coal tar pitch from raw coal. The method can utilize any of the systems or components disclosed herein. The method 100 can include act 110, which recites "generating high-velocity highly-loaded slurry flows. Act 110 can be followed by act 120, which recites "minimizing oxidation of the high carbon-containing coal tar pitch." Acts 110 and 120 of the method 100 are for illustrative purposes. For example, the acts 110 and 120 can be performed in different orders, split into multiple acts, modified, supplemented, or combined. In an example, one or more of the acts 110 or 120 of the method 100 can be omitted from the method 100. Any of the acts 110 or 120 can include using any of the fluid collection assemblies or systems disclosed herein.

Act 110 can include, in some examples, feeding the raw coal into an inlet of a twin screw device with co-rotating screws described more fully below. In some embodiments, act 110 can include treating the raw coal with a solvent extraction process prior to feeding the raw coal into the inlet of the twin screw device with co-rotating screws. Act 110 can include providing a co-feed into an inlet of a twin screw device including at least one of petroleum distillates and specialized solvents. Act 120 can include, in some embodiments, generating high-velocity highly-loaded slurry flows in an inert gas environment. In some embodiments, the entire method 100 can be conducted in the inert gas environment. In other embodiments, only a portion of method 100 can be conducted in the inert gas environment.

According to one exemplary embodiment, an apparatus imposing high shear and high Reynolds number flow (akin to ablative flow) in large L/D ratio pipes/tubes is used. In addition to high shear flow, another beneficial design parameter is high surface to volumetric flow ratio. These parameters can be designed into the system with or without catalytic wall coatings of Fe/Mo/Ni, or similarly alloyed into the metal tubing alloy material itself.

Another exemplary embodiment includes a mechanical system for achieving similar non-fouling objectives. The exemplary embodiment employs a twin screw device with co-rotating screws of sufficiently high surface area to volume ratio, made of metals containing known catalysts such as iron (Fe), molybdenum (Mo), and nickel (Ni), which also retain some catalytic activity when sulfided, especially Fe and Mo. The present exemplary system avoids coke build-up and accumulation, thereby preventing a reduction in catalyst activity. Furthermore, the present system also reduces excessive fouling, which can also lead to unwanted flow reactant flow restrictions. Tolerances between flight edges and barrel internals can be adjusted to certain ranges (<1~2 mm). Flight rotations can also be reversed periodically for cleaning.

A third exemplary embodiment includes a serially connected system including a slurry mix tank that feeds a mechanically driven twin screw device serving as a visco-mechanico preheater. This configuration surmounts traditional challenges associated with coal swelling during preheat and wall fouling.

According to one exemplary embodiment, a number of challenges are introduced with coal processing because coal tends to swell at about 330° C.~360° C., which can send slurry-oil viscosities to unacceptably high levels. However, this problem has not yet been addressed in the coal to pitch industry.

According to one exemplary embodiment, challenges such as formation of undesirable inclusions or cross-linking carbon in the coal tar pitch can be introduced into the system by oxidation of the pitch and/or intermediate materials. This undesirable cross-linking can break the carbon fiber as it is being drawn during the spinning process and/or can cause fouling of portions of the connected system.

In some embodiments, portions of the present connected system can include an inert gas environment or an absence of oxidative gas to improve conversion of the coal tar pitch to a carbonized fiber. The temperature elevation rate and heating temperature can be appropriately selected so as to obtain the desired internal texture, graphite content, hardness, etc. without forming undesirable imperfections in the fiber. In one example, as the pitch is drawn from the mechanically driven twin screw device, an oxidation layer can be formed. In some embodiments, the outlet of the twin screw device can include an extrusion die. Further, the formation of the pitch to enable fiber spinning can include a cooling gas applied to the pitch upon exiting the extrusion die. To control oxidation at the outlet of the twin screw device, an inert gas shield can be included at the extrusion die outlet. In some embodiments, the cooling gas may also be an inert gas. In some embodiments, the extruded pitch may remain in the inert environment as it cools to at least below 200° C.

In some embodiments, an inert gas environment can also be included at an inlet of the twin screw device. Including an inert gas environment at the inlet of the twin screw device can protect the components of the preheater and further reduce inclusions in the coal tar pitch.

According to one exemplary embodiment, including the inert gas shield at the outlet of the twin screw device improves the measured dropping point of a sample of the pitch. In an exemplary embodiment, a pitch may form a carbon fiber having desirable properties when a single uniform drop of pitch was formed during a Mettler test method operation in air. In some embodiments, dropping point ranges from about 220° C. to about 350° C. can produce a carbon fiber having desirable properties.

According to one exemplary embodiment, the preheat process can also include a solvent extraction process to treat coals having a relatively high oxygen and/or high sulfur content, which may make the pitch more reactive. In some embodiments, the oxygen content of the coal prior to treatment can be as high as 20%. The coal based slurry can be treated with a solvent to remove phenolic impurities, which can include oxidizing compounds. Removal of the phenolic can reduce the reactivity of the pitch, and thus lower the reactivity of the pitch.

According to one exemplary embodiment, the preheat process can be adjusted for highly aromatic non-polar solvent, or highly aromatic decant oil can be used to prevent the high viscosities. Additionally, according to one embodiment, the coal based slurries can be prepared at approximately 316° C. under pressure (just at the onset of swelling). When exiting, the coal based slurry can exit at a liquefaction 'light-off' temp range of 349° C.-371° C.; at which point hydrogenation and dissolution kinetics proceed exothermically; and certain amounts of hydrogen and/or solvent (acting as 'coolants') are added to the tubular flow reactors to control temperatures below a maximum allowable of 427° C.-482° C. A once through powdered catalyst, such as, but in no way limited to, 50 ppm of water soluble PMA— phospho molybdic acid can also be added to the slurry.

According to one exemplary embodiment, the coal can be ground to ~100 mesh and can be mixed with VGO, and a catalyst can be transferred to the slurry tank. The overall process can include feeding slurry made of an approximate 1/1/1 mixture of dried coal (2 pounds), coal derived VGO (2 pounds), vacuum bottoms (2 pounds) and ppm quantities of catalyst per hour to the reactor. A constant pressure of 17.24 Mpa (2500 psig) can be maintained through use of a pressure control valve and a constant flow of hydrogen throughout the operation. The vacuum bottoms and liquid products can be collected every 6 hours. The liquid product can then be distilled to generate water, and 343 deg. C. (650 deg. F.) heavy oil (VGO).

According to one exemplary embodiment, leakage of the pitch from portions of the connected system and/or fouling can be minimized and/or prevented by sealing with a Grafoil® sealant paste. In some examples, the Grafoil® paste can further lubricate the system without introducing further impurities.

In some examples, fouling may be further minimized by varying the rotation speed of the rotating screws of the twin screw device. Increasing the rotation speed can increase the flow speed, and thus, increase the Reynolds number. In some embodiments, the rotation speed can be varied as a function of one of the operating parameters of the connected system. In some embodiments, the rotation speed can be increased upon opening a valve coupled to the extrusion die. In other embodiments, the rotation speed can be regulated as temperature and/or pressures are altered.

According to one exemplary embodiment, numerous additional embodiments of the present systems and methods can include any number of reactor types, such as, but in no way limited to, a PFR tubular reactor or twin screw reactor, a 'self-catalyzed' reactor, a staged reactor, and the like. Similarly, the feeds for the process can be supplied from any number of sources including, but in no way limited to, predominantly raw coal, dried, and, according to one exemplary embodiment, heat treated moderately to remove unwanted non-pitch forming light volatiles.

The feeds can experience any number of preheating methods, such as, but in no way limited to visco-mechanico heating in a compressive section of twin screw device, electromagnetic, induction heated field coupled with graphite characteristics of coal, addition of high temp co-feeds such as hot hydrogen, hot liquid pitch precursors, hot isotropic/mesophase pitch, etc. According to one exemplary embodiment, the present exemplary systems and methods can avoid 'hot wall' conductive/convective heating methods which are conducive to fouling/coking.

Additionally, according to one exemplary embodiment, a number of co-feeds can be used to generate the present exemplary high carbon-containing coal tar pitch, including, but in no way limited to, petroleum distillates, specialized solvent types/cuts configured to suppress fouling, minimize coal swelling, etc. Additional co-feeds can include, but are in no way limited to, catalysts (hydrogenation catalysts Fe, Mo, Ni, etc.) and/or promotors such as graphite, graphene, mesophase pitch and/or isotropic pitch itself.

The present system can be used to generate any number of products, including, but in no way limited to, pitches, anthracene oils, and/or other liquid specialties. Additionally, according to one exemplary embodiment, the solvent can be recycled.

Figure 2:
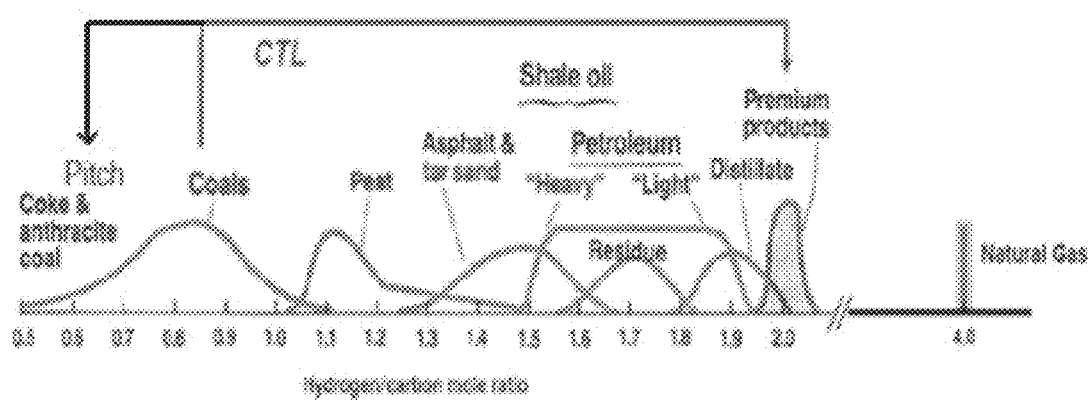
FIG. 2 is a chart displaying hydrogen by carbon (H/C) ratios of various hydrocarbon sources.

Referring to FIG. 2, in contrast to past coal-to-liquid work that is solely comprised of converting coal (H/C ~0.8) to petroleum-like products with H/C 1.5~2.0, the present exemplary system and method is in direct contrast to past efforts and promotes the production of lower hydrogen containing pitch products with H/C~0.6. This system and method is focused on high value, high melting, high boiling, and high carbon containing products.

As a departure from past practice of utilizing back-mixed reactors, such as the tank reactors described in WVU patent U.S. Pat. No. 8,226,816 and fully back-mixed ebullated bed reactors, the present exemplary flow preheater-reactor system is reliable, cost effective, and as a compact continuous production unit embodies process intensification attributes/benefits. Furthermore, because of the virtual plug flow reactor design, the avoidance of back mixing is achieved, resulting in a narrower product distribution range with improved selectivity to the desired products in comparison the tank reactors.

As an improvement and departure from the isotropic pitch process of traditional systems, such as that disclosed in U.S. Pat. No. 9,222,202 to Malone and Lee, the present system and method does not require pre-processed petroleum liquids or pre-processed coal tars, and allows for direct conversion of raw coal to isotropic pitch in one chemical conversion step.

Figure 3:
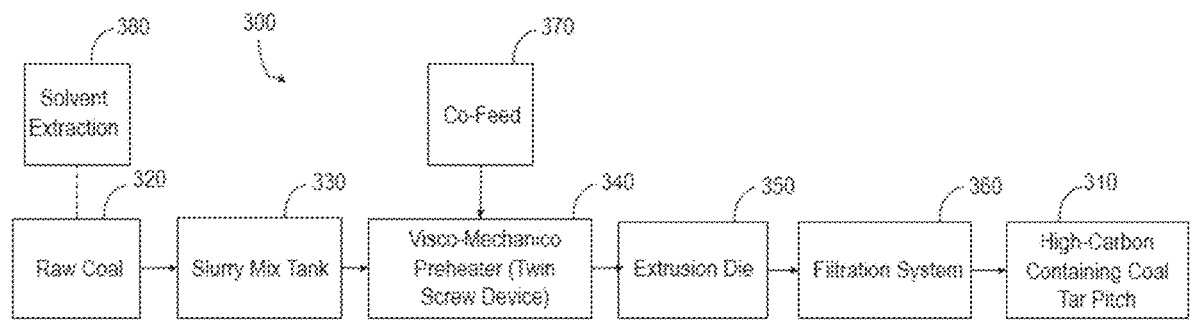
FIG. 3 is a flow diagram of a system for the manufacture of high melting hydrocarbons from coal, according to an embodiment.

Referring now to FIG. 3, in some embodiments, a system 300 for forming high carbon-containing coal tar pitch 310 from raw coal 320 including a serially connected system includes a slurry mix tank 330 feeding a mechanically driven twin screw device 340 configured to operate as a visco-mechanico preheater. The raw coal 320 can be ground to ~100 mesh and filtered. Then the raw coal 320 may be subjected to a low severity direct coal liquefaction process (LSDCL) that can remove impurities and/or inclusions prior to feeding the mechanically driven twin screw device 340.

In some embodiments, the twin screw device 340 may include co-rotating screws. The co-rotating screws may include catalyst metals that retain catalytic activity when sulfided. The catalyst metals may include one of Fe (Iron), Mo (Molybdenum), or Ni (Nickel). In some embodiments, the slurry mix tank 330 may include an outlet coupled to the twin screw device. The system 300 may further include an extrusion die 350 disposed at an outlet of the twin screw device.

The twin screw device 340 may be configured to upgrade an isotropic pitch to a mesophase pitch by thermo-mechanical processing. In some embodiments, the twin screw device 340 may further include other processing methods such as long tubes, loops, mixers, or twin-screw extruders in order to be done continuously. According to one exemplary embodiment, the visco-mechanico preheater 340 may operate at a temperature from about 200° C. to about 400° C. Other parameters may include a temperature ramp rate from about 1° C. to about 50° C. per minute. The operating temperature and temperature ramp rate may be controlled to minimize inclusions in the pitch and/or prevent or minimize fouling. According to one exemplary embodiment, a shear rate of the pitch may include about 10 $s^{-1}$ to about 400 $s^{-1}$. In some embodiments, the twin screw device 340 may operate at between about 50 rotations per minute (RPM) to about 400 RPM. In some embodiments, a viscosity and a melting temperature of the desired mesophase pitch may include but not be limited to those disclosed in U.S. Pat. No. 4,504,454, the disclosure of which is incorporated herein by reference in its entirety. Further, the mesophase pitch may include a mesophase content of about 30% to about 90%.

According to one exemplary embodiment, the system 300 may include a co-feed 370. Co-feed 370 may include at least one of a petroleum distillate, a specialized solvent, a catalyst, and a promotor. The specialized solvent may be configured to suppress the fouling and minimize coal swelling. In some embodiments, the promotor may include at least one of a graphite, a graphene, a mesophase pitch, and an isotropic pitch.

The extrusion die may include a valve that allows the pitch to extrude from the visco-mechanico preheater when open. In some embodiments, the system 300 may further include a filtration system 360 coupled to the extrusion die 350. In some embodiments, the filtration system 360 may be configured to filter impurities such that the high carbon-containing coal pitch 310 includes lower hydrogen containing pitch products with H/C~0.6. The filtration system 360 may include at least one of a mechanical filter and/or a centrifuge.

According to one exemplary embodiment, at least a portion of the system 300 may include an inert gas environment. In some embodiments, the inert gas may include $N_2$ (Nitrogen). In other embodiments, the inert gas may include a noble gas or a combination of gasses. In some embodiments, the inert gas environment includes at least one of an inlet and an outlet of the twin screw device 340.

According to one exemplary embodiment, the system 300 may include a solvent extraction process 380. Solvent extraction 380 may include separating components of the raw coal 320 by the relative solubility of the components. In some embodiments, the solvent extraction process 380 may lower the phenolic concentration of the raw coal and/or remove at least a portion of the oxygen content.

According to one exemplary embodiment, the preheat process may include a filtering process to remove inclusions and/or cross-linked imperfections from the pitch. Generally, inclusions make filtering difficult and more costly. Further, inclusions in the carbon fiber may reduce the strength and quality of the fiber.

Figure 4:
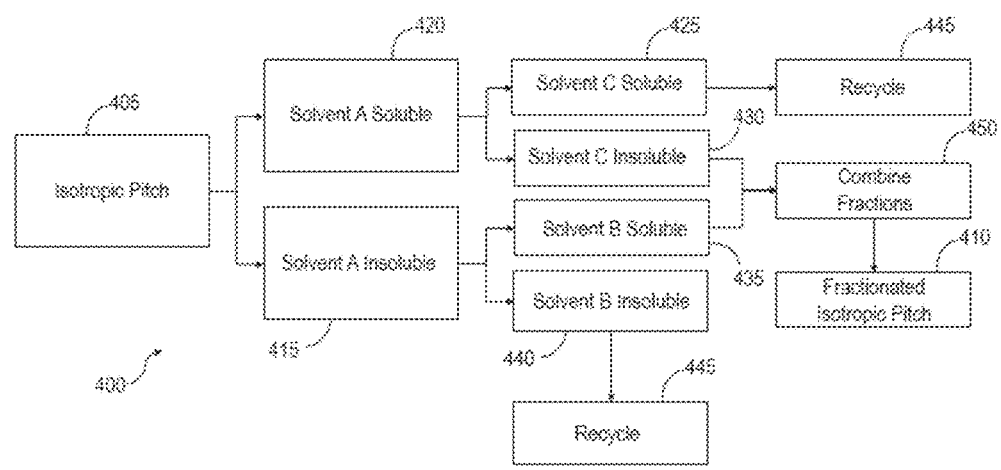
FIG. 4 is a flow diagram of a system for a solvent fractionation process for an isotropic pitch, according to an embodiment.

FIG. 4 describes an example system for a solvent fractionation process 400 for an isotropic pitch. In solvent fractionation, an isotopic pitch 405 may be converted into a fractionated isotropic pitch 410. Fractionation may be a separation process in which the isotropic pitch 405 can be divided during a phase transition into a number of smaller quantities, where the composition can vary according to a gradient as the isotropic pitch 405 is refined. In some embodiments, the solvent fractionation process 400 can include fractional crystallization based on a difference in solubility at a given temperature. According to one exemplary embodiment, the given temperature of the solvent fractionation process 400 can be from about 200° C. and greater. As an example process, the isotropic pitch 405 can be included in a first solvent 'A' where the isotropic pitch components are either soluble or insoluble in solvent A. The solvent A insoluble pitch 415 can then be treated with a solvent 'B.' The solvent B soluble pitch 435 can be separated from the solvent B insoluble pitch 440. Further, the solvent A soluble pitch 420 can be treated with solvent 'C.' The solvent C soluble pitch 425 is likewise separated from the solvent C insoluble pitch 430. In some embodiments, the solvent B insoluble pitch 440 and the solvent C insoluble pitch can be recycled 445 in the solvent fractionation process 400, and the solvent C insoluble pitch 430 and the solvent B soluble pitch 435 can be combined to produce combine fraction 450. The combine fractions 450 can be further processed to produce the fractionated isotropic pitch 405. The fractionation process can include a variety of solvents and/or fractionation steps. Further, the fractionation solvents can include a single solvent or combination of solvents, as desired to upgrade the isotropic pitch 405 to the fractionated isotropic pitch 410.

In some embodiments, the filtering process can include at least one mechanical filter within the connected system. In other embodiments, the filtering process can include a centrifuge. The centrifuge can separate various components of the pitch by spinning at a high speed to separate the components of the pitch by density of the components. In some embodiments, at least one mechanical filter can be used in combination with a centrifuge. Other methods of filtering can be included. In some embodiments, other suitable filtration methods can be included such as chemical filtering, distillation, selective adsorption, etc.

Specifically, the present system and methods differ from the pre-existing technology generally in several respects:
1. Departure from typically back-mixed systems which suffer from overly broad product distribution (selectivity), large sized reactors with low SA/volume ratios unable to take advantage of what would otherwise be beneficial catalytic wall effects (low conversion per unit reactor volume).
2. Departure from direct fired preheaters which suffer from fouling, yield loss, uptime losses, etc.
3. Departure from systems that historically relied upon low yield (~4%) coal tar byproducts from coking. The present system is on-purpose direct from coal in high yield to pitch.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A system for forming high carbon-containing coal tar pitch from raw coal, comprising:
    a slurry mix tank, wherein a solvent extraction process is configured to separate components of the raw coal by relative solubility of components of the raw coal to form an isotropic pitch and remove phenolic impurities;
    a twin screw device with co-rotating screws;
    the co-rotating screws including catalyst metals that retain catalytic activity when sulfided, wherein the system further comprises an inert gas environment at the inlet of the twin screw device and at an outlet of the twin screw device; and
    an extrusion die disposed at an outlet of the twin screw device the inert gas environment included at an outlet of the extrusion die, wherein an extruded pitch remains in the inert gas environment as the extruded pitch cools to at least below 200° C.

2. The system of claim 1, wherein the twin screw device is configured to convert the isotropic pitch to a mesophase pitch.

3. The system of claim 1, further comprising a filtration system coupled to the extrusion die, wherein the filtration system is configured to filter impurities such that the high carbon-containing coal pitch includes lower hydrogen containing pitch products with H/C~0.6.

4. The system of claim 3, wherein the filtration system comprises at least one of a mechanical filter and a centrifuge.

5. The system of claim 1, further comprising a co-feed including at least one of a petroleum distillate, a specialized solvent, a catalyst, and a promotor.

6. The system of claim 5, wherein the promotor comprises at least one of a graphite, a graphene, a mesophase pitch, and an isotropic pitch.

7. A system for forming high carbon-containing coal tar pitch from raw coal, the system comprising:
    a serially connected system including a slurry mix tank feeding a mechanically driven twin screw device configured to operate as a visco-mechanico preheater, wherein the slurry mix tank comprises a solvent extraction process configured to separate components of the raw coal by relative solubility of components of the raw coal to form an isotropic pitch and remove phenolic impurities, wherein the twin screw device comprises co-rotating screws, the co-rotating screws including catalyst metals that retain catalytic activity when sulfided, wherein an inlet and an outlet of the twin screw device comprise an inert gas environment; and
    an extrusion die disposed at the outlet of the twin screw device, wherein an extruded pitch remains in the inert gas environment as the extruded pitch cools to at least below 200° C.

* * * * *